United States Patent [19]
Janetos

[11] Patent Number: 6,041,957
[45] Date of Patent: Mar. 28, 2000

[54] INTEGRALLY SHAPED CROSSLINKED POLYMER FOAM BOX

[75] Inventor: Andrew E. Janetos, Rollinsford, N.H.

[73] Assignee: Andrew Janetos, Rollinsford, N.H.

[21] Appl. No.: 08/421,489

[22] Filed: Apr. 13, 1995

[51] Int. Cl.[7] .............................. B65D 1/22; B65D 43/16
[52] U.S. Cl. .................... 220/4.23; 220/4.24; 220/62.22; 220/839
[58] Field of Search .................................. 220/4.24, 4.23, 220/339, 337, 4.22, 839, 837, 62.14, 62.22

[56] References Cited

U.S. PATENT DOCUMENTS

| | | |
|---|---|---|
| 4,298,133 | 11/1981 | Davis . |
| 4,382,536 | 5/1983 | Congleton . |
| 4,552,708 | 11/1985 | Kimura et al. .............................. 264/53 |
| 4,848,543 | 7/1989 | Doboze . |
| 4,885,820 | 12/1989 | Erceg et al. . |
| 5,183,159 | 2/1993 | Hojnacki et al. . |
| 5,555,671 | 9/1996 | Voight et al. .............................. 43/57.1 |
| 5,564,623 | 10/1996 | Kiley ....................................... 229/164 |

Primary Examiner—Allan N. Shoap
Assistant Examiner—Niki M. Eloshway
Attorney, Agent, or Firm—Hayes, Soloway, Hennessey, Grossman & Hage, P.C.

[57] ABSTRACT

A one-piece box for storing small objects, molded from a flexible polymer foam material comprising an integrally formed bottom section, cover and hinge, characterized in that the hinge section is resilient and is capable of repeated articulation, said hinge section comprising compressed foam having a density of greater than that of the bottom and cover sections, and wherein the bottom section and cover contain means for sealingly engaging said bottom and cover sections. In method form, the method comprises supplying a sheet of crosslinked polymer foam of thickness x, heating said sheet to a temperature sufficient to substantially uniformly heat the entire cross-section of said foam sheet, and placing said heated sheet into an unheated compression mold containing a hinge forming section of essentially zero tolerance and forming said box under a compression pressure sufficient to reduce the thickness x of the polymer foam sheet by a factor of about 15 at the hinge section.

11 Claims, 2 Drawing Sheets

INTEGRALLY SHAPED CROSSLINKED POLYMER FOAM BOX

FIELD OF THE INVENTION

This invention relates to an integrally shaped crosslinked polyethylene flexible foam box, and method for its manufacture.

BACKGROUND OF THE INVENTION

Polyethylene is a commodity plastic material, and has been used for a variety of consumer applications such as milk containers, commercial drum liners, disposable garbage bags, etc. In addition, a form of polyethylene known as polyethylene foam has been manufactured, which makes use of the established properties of polyethylene, but in a reduced density format. In addition, polyethylene foam has been crosslinked, to improve its durability in a given application. For example, crosslinked polyethylene foam has been used for such applications as exercise mats and as a protective layer in plastic helmets.

As noted above, the present invention is directed at an integrally shaped crosslinked polyethylene foam box, wherein an extremely durable integrally shaped hinge has been produced, which is capable of repeated articulation, without failure. The uniqueness of this invention, as more fully explained herein, lies in the fact that the crosslinked polyethylene foam has been reduced to very narrow dimensions at the hinge area, but unlike most crosslinked materials which tend to be brittle and particularly sensitive to repeated stress, the hinge material of the present invention maintains tremendous flexibility over extended use periods.

of course, the prior art describes a variety of packaging articles formed from foam materials, but none describes the novel features of the present invention.

As a prime example, in U.S. Pat. No. 4,885,820, there is described the use of a hinge for joining surfaces of sheet material which comprises a strip of film or foam laminate positioned with a foam layer across the surfaces to be joined. The foam layer is tackified by heating and pressure is applied to the strip, thus heat sealing the strip to the surfaces. The hinge strip is preferably polyethylene film laminated to polyethylene foam and the surfaces to be joined may be polyethylene foam or a film/foam laminate. The significance of this disclosure is that until only recently, the prior art suggested that in the case of polyethylene foam, a separate hinge joint was necessary to join foam sheets in order to prepare a working hinge element.

Other related prior art includes U.S. Pat. No. 4,848,543 which describes a thermally insulated disposable container for food items, which was formed of a unitary sheet of plastic foam material whose lower and upper sections each form with a round flat member and a drafted side wall. An integrally shaped flexible hinge was said to connect the portion of the rim of each of the upper and lower sections, so that the sections could be closed with the food items contained inside. However, this particular integrally shaped foam box was formed from a unitary sheet of polystyrene foam (which is not crosslinked). Moreover, this disclosure fails to teach or suggest that the crosslinked polyethylene foam can be pressed into a reduced thickness hinge element that is capable of repeated flexing.

Other related prior art appears in U.S. Pat. No. 4,382,536, which like the '543 patent, employs polystyrene, but which reports the preparation of an egg carton (with a non-expanded skin on one side) including an integrally formed cover and tray portions interconnected together by a pair of hinges adjacent opposite sides of a hinge band. In particular, the '536 patent described that thin resiliently bendable flaps for cushioning eggs in the carton had not been prepared from polystyrene because of perceived limitations on the capabilities of thermo-molding polystyrene material. The '536 patent goes on to state that in accordance with the invention described therein, it had been found that a thin polystyrene flap for cushioning eggs could be thermo-formed utilizing a sheet of polystyrene with a non-expanded skin on one side. The '536 patent emphasizes that the polystyrene sheet with the skin side facing the male section of the mold is pressed between the male and female mold members, wherein the flap hinge becomes essentially the skin portion of the polystyrene sheet without the expanded foam layer thereon. In addition, the '536 patent emphasizes that the minimum gap between the mold sections which form the flap hinge was in the range of about 0.005 inches to 0.011 inches.

In U.S. Pat. No. 4,298,133 there is described a foam plastic disposable tray and cover typically used for takeout dinners at fast food establishments. The tray and cover were said to be joined by an integral hinge along one side edge. However, in a manner similar to U.S. Pat. No. 4,382,536, there was no teaching regarding a reduction in thickness of the foam at the hinge region.

More recently, in U.S. Pat. No. 5,183,159, there is described a reusable container for packaging objects for shipping. The container was said to comprise a pair of outer frame members having a clamshell configuration in which the two frame members were connected by a reclosable hinge of the same thickness as the box. The hinge was said to be designed to permit articulation between an open and closed position, and those plastic materials which were described as suitable were polymers and copolymers such as polyvinyl chloride, polyethylene terethalate (PET), polyethylene terethalate/glycol modified (PETG) and PVC PET or PETG copolymers. Crosslinked polyethylene foam is not mentioned, and in addition, it should be noted that the '159 patent, with respect to the polymers mentioned above, was concerned with the use of such polymers in non-foam or film form.

Accordingly, the principal object of the present invention is to provide an integrally shaped flexible crosslinked foam container which is equipped with an integrally shaped hinge, which is capable of repeated articulation without failure.

Another object of this invention is to provide a method for manufacturing an integrally shaped flexible crosslinked foam container, by essentially a single-step manufacturing process wherein the crosslinked foam is heated to a desired temperature and pressed into container configuration, said container containing an integrally shaped hinge section, the hinge section comprising a reduced thickness hinge element capable of repeated flexing.

A still further object of this invention is to provide an integrally shaped crosslinked foam box, prepared from flexible crosslinked polyethylene, optionally including a fabric coating, which in combination with the integrally shaped hinge, provides essentially unlimited repeated articulation at the hinge section (opening and closing) without failure due to repeated stress.

SUMMARY OF THE INVENTION

A one-piece box for storing small objects, molded from a flexible crosslinked polymer foam material comprising an integrally formed bottom section, cover and hinge, characterized in that the hinge section is resilient and is capable of repeated articulation, said hinge section comprising compressed foam having a density of greater than that of the bottom and cover sections, and wherein the bottom section and cover contain means for sealingly engaging said bottom and cover sections. In method form, the method comprises supplying a sheet of crosslinked polymer foam of thickness x, heating said sheet to a temperature sufficient to substantially uniformly heat the entire cross-section of said foam sheet, and placing said heated sheet into an unheated compression mold containing a hinge forming section of essentially zero tolerance and forming said box under a compression pressure sufficient to reduce the thickness x of the polymer foam sheet by a factor of 15± at the hinge section.

DETAILED DESCRIPTION OF THE INVENTION

Figure 1:
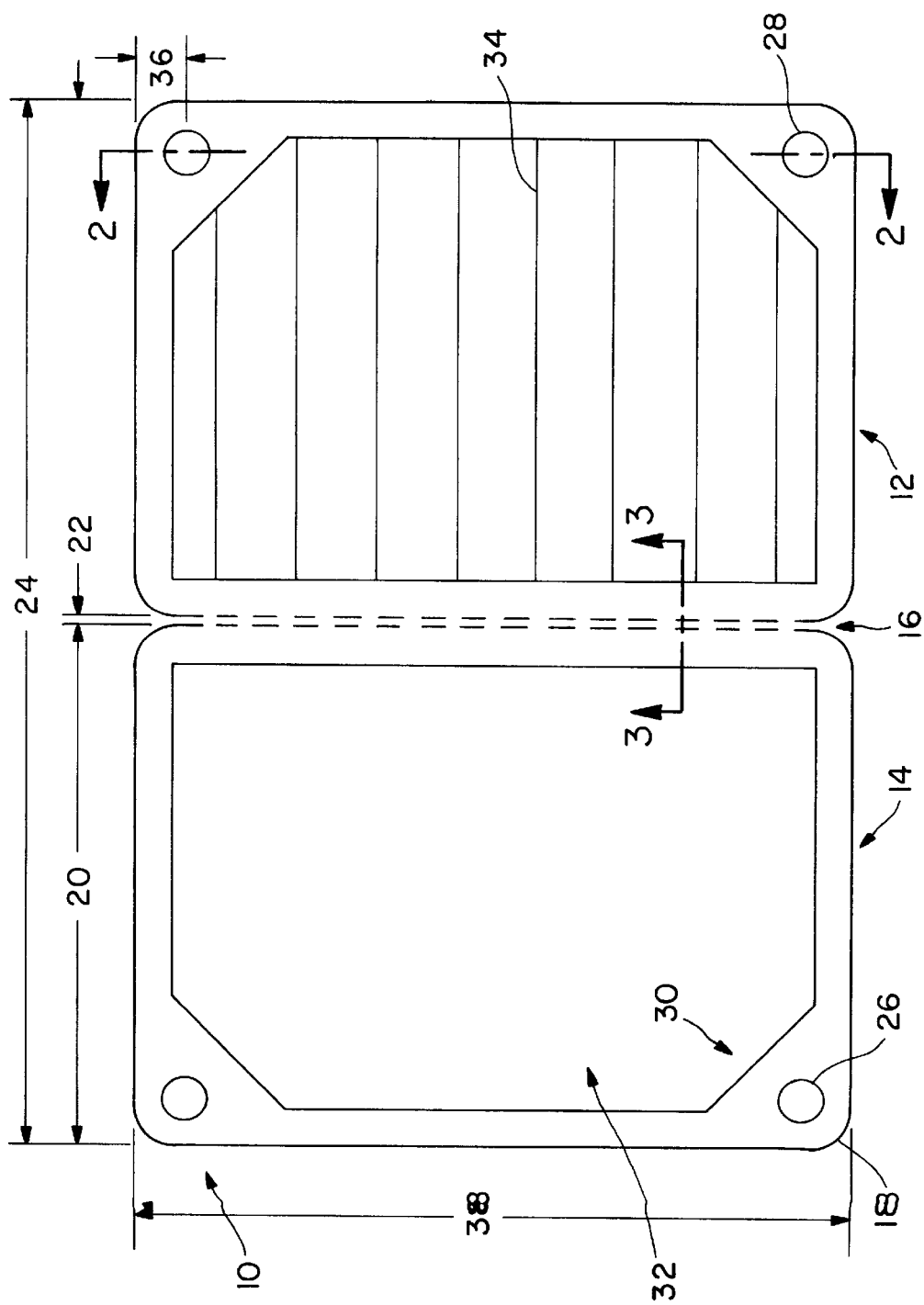
FIG. 1 is a perspective view of the one-piece box of the present invention showing the box in open position.

As noted, the present invention comprises a one-piece box for storing small objects, molded from a crosslinked polymer foam material comprising an integrally formed bottom section, cover and hinge, characterized in that the hinge section is resilient and is capable of repeated articulation, said hinge section comprising compressed foam having a density greater than that of the bottom and cover sections, and in one preferred embodiment at least twice the density of the bottom and cover sections, and wherein the bottom section and cover contain means for sealingly engaging the bottom and cover sections.

Alternatively, the present invention can be described as a one-piece box molded from a crosslinked polymer foam material comprising an integrally formed bottom section, cover section and hinge section, characterized in that the hinge section is resilient and is capable of repeated articulation, said hinge section comprising foam which has been compressed sufficiently so that the hinge portion is essentially free of pores and wherein the bottom section and cover section contain means for sealingly engaging said bottom and cover sections.

In a still further embodiment, the present invention can be described as a one-piece box molded from a crosslinked polymer foam material comprising an integrally formed bottom section, cover section and hinge section, characterized in that the hinge section is resilient and is capable of repeated articulation, said hinge section comprising foam which has been subjected to sufficient heat and pressure to plasticate the cell walls of the foam at the hinge section and form a substantially solid hinge less than 0.060 inch in thickness, and wherein the bottom section and cover section contain means for sealingly engaging said bottom and cover sections.

Finally, in yet another embodiment, the present invention comprises a one-piece box molded from a crosslinked polymer foam material comprising an integrally formed bottom section, cover section and hinge section, characterized in that the hinge section is resilient and is capable of repeated articulation, said hinge section comprising foam which has been subjected to sufficient heat and pressure to collapse the cell walls of the foam at the hinge section and form a substantially solid hinge less than 0.060 inch in thickness, and wherein the bottom section and cover section contain means for sealingly engaging said bottom and cover sections.

Preferably, the flexible polymer foam is flexible crosslinked polyethylene foam, and the use of other types of flexible foams such as polyurethane foam are contemplated, but result in increased material costs.

A particular preferred flexible crosslinked polyethylene foam has a density range of about 1 lb/ft$^3$ to about 10 lbs/ft$^3$, and in an even more preferred embodiment, the density is in the range of about 4 lbs/ft$^3$ to about 6 lbs/ft$^3$. In addition, the crosslinked polyethylene foam can be of uniform density throughout the cross-section of the box, or optionally, a multi-layer section of crosslinked polyethylene foam, laminated together by flame adhesion, of different density. For example, in one particularly preferred embodiment, the layer of foam which serves as the outer cover layer has a density of about 6 lbs/ft$^3$, whereas the inner layer (i.e. the layer which forms the inside surface of the box) has a density of about 4 lbs/ft$^3$. In such a manner, a slightly softer to the touch surface is created in the interior of the box.

The integrally formed hinge preferably has a thickness in the range of 0.015–0.060 inches, and a width of about 1/16". It has been found, in accordance with the present invention, that such narrow thickness and width surprisingly affords generally outstanding resistance to both repeated articulation and tearing. For example, a hinge of about 0.025 inches was found to have a tear strength of about 10 lbs.

In addition, preferably, the means for sealingly engaging the bottom and cover sections comprises magnetic inserts at the inside periphery of the bottom and cover sections. With regards to said integrally formed hinge section, it should be appreciated that in the context of the present invention, one advantageous and extremely attractive feature of the present invention is that the hinge section, while being capable of repeated articulation without failure, can also be forced into a closed position, with the use of the previously mentioned magnetic inserts. That is, ordinarily, when one attempts to prepare a hinge section that has both the strength and resiliency of the present invention, by separately attaching a separate hinge forming film or the like of greater thickness and/or diameter than the integrally formed hinge described herein, the situation presented is such that a larger force is necessary to force the hinge into the closed configuration, making the use of small peripherally disposed magnets much more difficult or impractical. However, as noted, in the present invention, small magnetic inserts installed at the periphery, with opposite poles disposed between the cover and bottom sections, serves to sealingly engage the box.

Although it has been found that the integrally formed hinge of the present invention has the outstanding resiliency and strength characteristics noted above, such properties can be improved upon further if the outer surface of the box, including the hinge section itself, are coated with a fabric material capable of stretching in two directions. For example, if one employs a segmented polyurethane block copolymer/nylon fabric, in certain form sold under the trademark "LYCRA", one enhances further the strength of the hinge section, while also providing an attractive cover to the flexible foam box. Along such lines, and in a preferred manner, a 4–5 oz. nylon/"LYCRA" fabric coating was applied to a crosslinked foam of about 6 lbs/ft$^3$, by flame adhesion, although adhesion by prior application of liquid or film is also possible.

In method form, the present invention comprises first supplying a sheet of crosslinked polymer foam of thickness x, heating said sheet to a temperature sufficient to substantially uniformly heat the entire cross-section of the foam sheet, and placing the heated sheet into a compression mold containing a hinge forming section of essentially zero tolerance, and forming the box under a compression pressure sufficient to reduce the thickness x of the polymer foam sheet by a factor of about 15 at the hinge section.

With regards to the now disclosed method, it has been found that preferably, the crosslinked polyethylene foam is heated to a temperature of about 320–340° F. If the temperature is not substantially uniform through the cross-section of the foam sheet, it has been found that upon compression, there is non-uniform shaping, and irregular shaped boxes are produced. For example, if non-uniform heating is present, or overheating or underheating is present, the box may not seal, edge-to-edge, after cooling, after insertion of the previously described magnetic inserts. Preferably, the step of compression molding the heated foam is carried out at pressures of about 1 to 5 tons.

With reference to FIG. 1, which is a perspective view of the one-piece box of the present invention showing the box in open position, the box 10 contains a bottom section 12, a cover section 14 and hinge section 16, which are all of unitary construction. The box preferably contains rounded corners 18, which in a preferred embodiment are of a 0.25 inch radius. The dimensions of the box shown at 20, in a particularly preferred embodiment, is 3.5 inches, the width of the hinge section 22 is about 0.062 inches, and the length 24 of the entire box is about 7.0625 inches.

Shown at 26 and 28, respectively, are the means for sealingly engaging the cover and bottom sections, and which indicate the insert section for placement of the magnetic inserts with opposite poles disposed. In addition, shown at the corner section 30 of the box, is the placement of additional foam material to contribute to the strength of said corner regions.

As can also be seen in FIG. 1, the cover section contains a flat section 32 and a bottom section with a ripple configuration 34, which in a preferred embodiment, facilitates the attachment of hooks, flies and the like, which are used in the recreational sport of fishing. In addition, the ripple construction affords improved capability for the attachment of small items of jewelry. Finally, shown at 36 is the edge section of the box, and in a preferred embodiment measures 0.344 inches, and the width of the box 38 is of the size 5.0 inches.

However, with respect to all of the above-recited preferred dimensions, it can be appreciated by those skilled in the art that such dimensions represent one preferred working example of the integrally formed one-piece box of the present invention, and other dimensions could be manufactured from the teachings disclosed herein.

Figure 2:
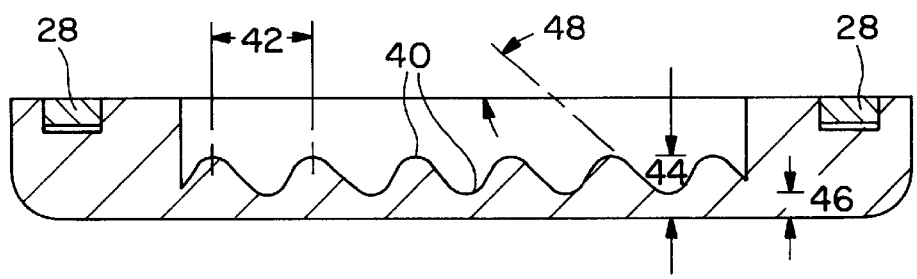
FIG. 2 is a perspective view taken along lines A—A of FIG. 1.

With reference to FIG. 2, which shows the cross-sectional perspective along the lines A—A of FIG. 1, the ripple configuration 40 can be seen as it appears on the bottom section of the box wherein the distance between the peaks of the ripples shown generally at 42 are preferably about 0.56 inches apart with the distance at 44 being about 0.31 inches and the region 46 measured at about 0.125 inches. Finally, the angle formed by the intersection of line 48 with the horizontal plane is about 40–45°.

Figure 3:
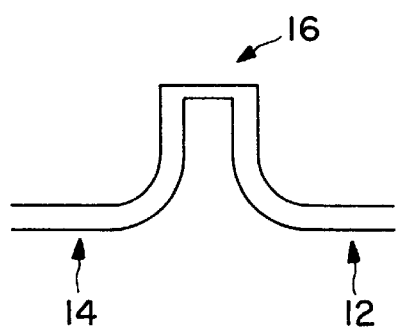
FIG. 3 is a perspective view taken along lines B—B of FIG. 1.

FIG. 3 is a perspective view taken along lines B—B of FIG. 1. Shown again at 16 is the reduced thickness hinge element that is integrally connected to the bottom 14 and top section 12 of the foam box, shown in substantially open position. Although the hinge is shown as being essentially flat, those skilled in the art will appreciate that this is only a representation of the general features of the hinge section, and the hinge can also have a slightly rounded surface and the like.

Figure 4:
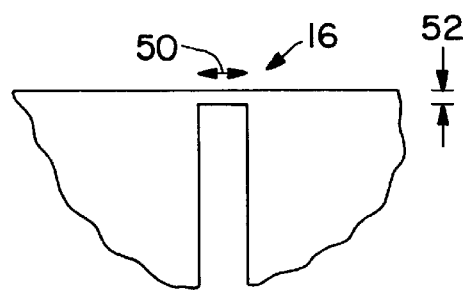
FIG. 4 is an isolated view of the hinge.

FIG. 4 presents an isolated view of the hinge again showing that the hinge section comprises compressed foam, which, as previously noted, has a density greater than that of the bottom and cover sections. The width of the hinge section shown by arrow 50 is on the order of about 0.062" and the thickness of the integral hinge shown by arrows 52 fall in the range of about 0.015 to 0.060 inches.

Figure 5:
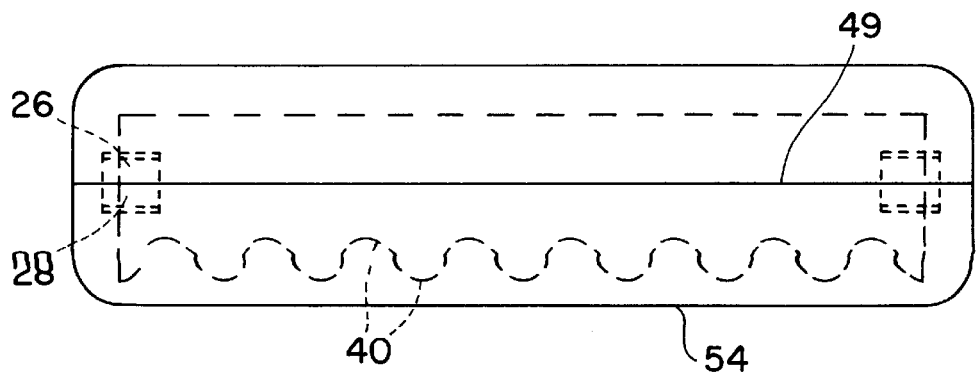
FIG. 5 is a perspective view of the box in the closed position, from the side position, showing in draft the interior configuration.

FIG. 5 illustrates a perspective view of the box in the closed position, from the side of the box, showing in draft some of the interior features. For example, at 49 is shown the hollow region inside the box for storing small objects, the magnetic inserts 26 and 28 sealingly engaging the cover and bottom sections and the molded-in ripple configuration 40 for attachment of a variety of small objects for safekeeping. Finally, at 54 is shown in the optional use of an outer fabric material which provides an attractive cover to the foam box itself and which also contributes to the resistance of the hinge section from tearing upon repeated articulation.

The following working example will serve to describe the features of the present invention.

EXAMPLE I

Crosslinked polyethylene foam sheet, of density 4 and 6 p.c.f., and of thicknesses 0.250 and 0.125 inches, respectively, available from the VOLTEK company, is laminated together by flame adhesion. The laminated foam is then heated in a tunnel type oven at 320–340° F. to provide substantially uniform cross-sectional heating of the laminate foam material. The heated laminated foam is then placed in a compression mold at room temperature and pressed into the desired shape by pressing for about 3 minutes at a pressure of about 50 psi. The hinge section is compressed to essentially zero thickness (mold plate to mold plate contact), such that the hinge section emerges from the mold with a density greater than that of the other sections of the integrally formed box, that is the cover and bottom sections. Upon demolding, the original 0.375 inch laminate foam is compressed to about 0.025 inch at the thinnest cross-section of either the bottom and cover sections, and the 4 and 6 p.c.f. foam in the cover and bottom sections at such location is compressed to a density of about 5 to 15 p.c.f., respectively.

In addition, it should be noted that the periphery of the mating surfaces of both the bottom and cover sections are also similarly pressed down to essentially zero tolerance, which upon demolding and die-cutting, provides a peripheral edge that enhances the rigidity and sealability of this peripheral edge section. Furthermore, in connection with this specific working example, it should be noted that the laminate of 4 and 6 p.c.f. foam can, optionally, prior to tunnel heating and compression, be further laminated with a fabric coating of a 4–5 oz. nylon/LYCRA (segmented polyurethane block copolymer) material.

Because modifications may be made of this invention without departing from its spirit, it is not intended to limit the scope of this invention to a single embodiment illustrated and described. Rather, the scope of this invention is determined by the appended claims and their equivalents.

What is claimed is:

1. A one-piece box for storing small objects, molded from a flexible crosslinked polymer foam material comprising an integrally formed bottom section, cover and hinge, characterized in that the hinge section is resilient and is capable of repeated articulation, said hinge section comprising compressed crosslinked foam having a density greater than that of the bottom and cover sections, and wherein the bottom section and cover contains means for sealingly engaging to one another said bottom and cover sections, wherein the crosslinked polymer foam material comprises two sheets of crosslinked polyethylene foam adhered to one another said sheets having different densities, the more dense sheet forming the outer layer of the cover section.

2. The box of claim 1, wherein the crosslinked polymer foam is crossedlinked polyethylene foam with a density in the range of about 1 lb/ft$^3$ to about 10 lb/ft$^3$.

3. The box of claim 1, wherein the integrally formed hinge has a thickness of about 0.015–0.060 inches.

4. The box of claim 1, wherein the integrally formed hinge has a thickness of about 0.025 inches.

5. The box of claim 1, wherein the integrally formed hinge has a length of about 5 inches.

6. The box of claim 1, wherein the means for sealingly engaging said bottom and cover sections comprises magnets.

7. The box of claim 1, wherein the magnets comprise magnetic inserts affixed to the inside periphery of the bottom and cover sections.

8. The box of claim 1, wherein the hinge has a tear strength of about 10 lbs.

9. A one-piece box for storing small objects, molded from a flexible crosslinked polymer foam material comprising an integrally formed bottom section, cover and hinge. characterized in that the hinge section is resilient and is capable of repeated articulation, said hinge section comprising compressed crosslinked foam having a density greater than that of the bottom and cover sections, and wherein the bottom section and cover contains means for sealingly engaging to one another said bottom and cover sections, wherein the outer surfaces of the cover, the bottom section and the hinge are affixed to a fabric material.

10. The box of claim 9, wherein the fabric material is formed from a nylon/segmented polyurethane block copolymer.

11. The box of claim 9, wherein the fabric material is capable of horizontal and vertical stretching.

* * * * *